United States Patent
Missry

(10) Patent No.: US 6,854,423 B2
(45) Date of Patent: Feb. 15, 2005

(54) BIRDHOUSE AND BIRD FEEDER COMBINATION

(75) Inventor: Eddie Missry, Dunellen, NJ (US)

(73) Assignee: Misco Enterprises Inc., Dunellen, NJ (US)

( * ) Notice: Subject to any disclaimer, the term of this patent is extended or adjusted under 35 U.S.C. 154(b) by 124 days.

(21) Appl. No.: 10/211,559

(22) Filed: Aug. 5, 2002

(65) Prior Publication Data

US 2004/0020444 A1 Feb. 5, 2004

(51) Int. Cl.[7] .............................................. A01K 31/00
(52) U.S. Cl. ...................................................... 119/429
(58) Field of Search ......................................... 119/429

(56) References Cited

U.S. PATENT DOCUMENTS

| | | | | |
|---|---|---|---|---|
| 3,053,226 A | * | 9/1962 | Dunn | 119/428 |
| 3,602,196 A | * | 8/1971 | Tucci | 119/429 |
| 3,730,139 A | * | 5/1973 | Moore | 119/429 |
| 4,167,917 A | * | 9/1979 | Noll | 119/429 |
| 4,425,873 A | * | 1/1984 | Rinne, Jr. | 119/53 |
| 5,740,762 A | * | 4/1998 | Bennett | 119/428 |
| D421,509 S | * | 3/2000 | Carpenter | D30/110 |
| 6,067,938 A | * | 5/2000 | O'Dell | 119/428 |

* cited by examiner

Primary Examiner—Charles T. Jordan
Assistant Examiner—Bret Hayes

(57) ABSTRACT

The present invention provides an integrated birdhouse/bird feeder unit comprising a housing including a base with an integrated lip so as to act as a perch, a first section forming a birdhouse, a second section forming a bird feeder, and a roof. The unit contains a common vertical wall forming a vertical wall between the birdhouse and the bird feeder. The roof of the integrated unit includes a first section above the bird feeder section which can move between an open position and a closed position for filling the bird feeder with bird food, and a second roof section above the birdhouse section which can move between open and closed positions for cleaning the birdhouse section.

In alternate embodiments, the bird feeder section of the combined birdhouse/bird feeder unit may include a see-through window formed of plastic. In addition, the aforementioned unit may include a third section forming a second birdhouse or a second bird feeder, or the like.

13 Claims, 3 Drawing Sheets

BIRDHOUSE AND BIRD FEEDER COMBINATION

FIELD OF THE INVENTION

The present invention relates to a birdhouse/bird feeder combination constructed as a miniature house design with four (4) walls and a slanted roof. The construction is preferably comprised of two adjacent integrated sections: one acting as the birdhouse section and the other acting as the bird feeder section.

BACKGROUND OF THE INVENTION

Typically, bird feeders and birdhouses are separate units of construction and as such, must be purchased separately. In addition, while most bird feeder and birdhouse assemblies have accessible slots and openings in order to fill them with bird food, they often fail to provide adequate openings or means in which to cleanse the respective assemblies. Thus, there is a need for a birdhouse/bird feeder combination that provides for both such entities in an integrated unit and further facilitates the ability to fill the integrated unit with bird food and cleanse the integrated unit as well.

It is an object of the present invention to provide a birdhouse/bird feeder combination that can be purchased as an integrated unit and which can be easily filled with bird food and easily cleaned.

DESCRIPTION OF THE PRIOR ART

U.S. Pat. No. 4,167,917 issued to NOLL discloses a birdhouse and bird feeder combination including a pitched top, two side walls and a back wall attached together, a bottom floor which is detachable and extends toward the front forming a feeding platform with shoulders preventing loss of the feed. The front wall has two detachable wall sections, the top having various size apertures, and the bottom section having a perch and a cover extending over the feeding platform. The front wall rests on the bottom floor and is detachable. However, it does not disclose the present invention.

SUMMARY OF THE INVENTION

The present invention provides an integrated birdhouse/bird feeder unit comprising a housing including a base with an integrated lip so as to act as a perch, a first section forming a birdhouse, a second section forming a bird feeder, and a roof. The unit contains a common vertical wall forming a vertical wall between the birdhouse and the bird feeder. The roof of the integrated unit includes a first roof section above the bird feeder section which can move between an open position and a closed position for filling the bird feeder with bird food, and a second roof section above the birdhouse section which can move between open and closed positions for cleaning the birdhouse section.

In alternate embodiments, the bird feeder section of the combined birdhouse/bird feeder unit may include a see-through window formed of plastic. In addition, the integrated unit may include a third section forming a second birdhouse or a second bird feeder, or the like.

DETAILED DESCRIPTION OF THE PREFERRED EMBODIMENTS

Figure 1:
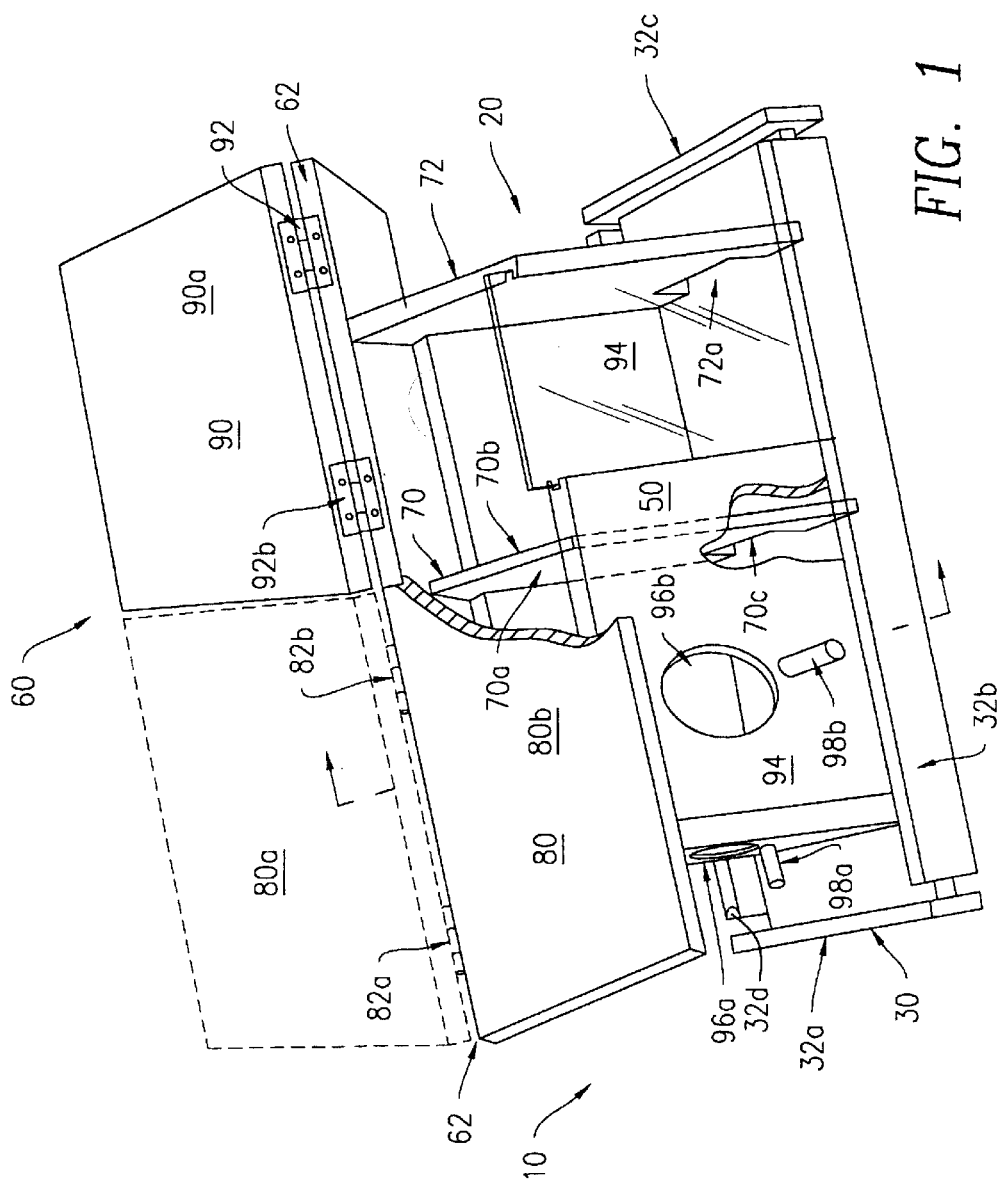
FIG. 1 is a perspective view of a birdhouse and bird feeder unit.

FIG. 1 shows an integrated birdhouse/bird feeder combination unit 10, comprising a housing 20, which includes a base 30 with an integrated perch 32 on each of the four (4) sides of the base, 32a, 32b, 32c, 32d; a first section 40 forming a birdhouse; a second section 50 forming a bird feeder; and a roof 60. A common vertical wall 70 forms a vertical wall 70a of the birdhouse and forms a vertical wall 70b of the bird feeder. The roof 60 includes a first roof section 80 attached to the fixed portion 62 of roof 60 above birdhouse 40 by hinges 82a and 82b for moving between an open position 80a, and a closed position 80b. Furthermore, the roof 60 includes a second roof section 90 attached to fixed portion 62 of roof 60 above bird feeder 50 by hinges 92a and 92b for opening roof section 90 to an open position 90a, for filling the bird feeder with bird food and returning it to a closed position 90b.

The bottom of wall 70 has an opening 70c so that bird food can pass through from bird feeder 50 to birdhouse 40. Far end wall 72 of bird feeder 50 also has an opening 72a so bird food can pass through bird feeder 50 to perch area 32c.

FIG. 1 shows the combined birdhouse and bird feeder 10 and the bird feeder 50 includes a see through window 94, formed of plastic. Also, the birdhouse 40 includes openings 96a and 96b for birds to enter the birdhouse 40 with peg perches 99a and 99b below the respective openings.

ALTERNATE EMBODIMENTS

Figure 2:
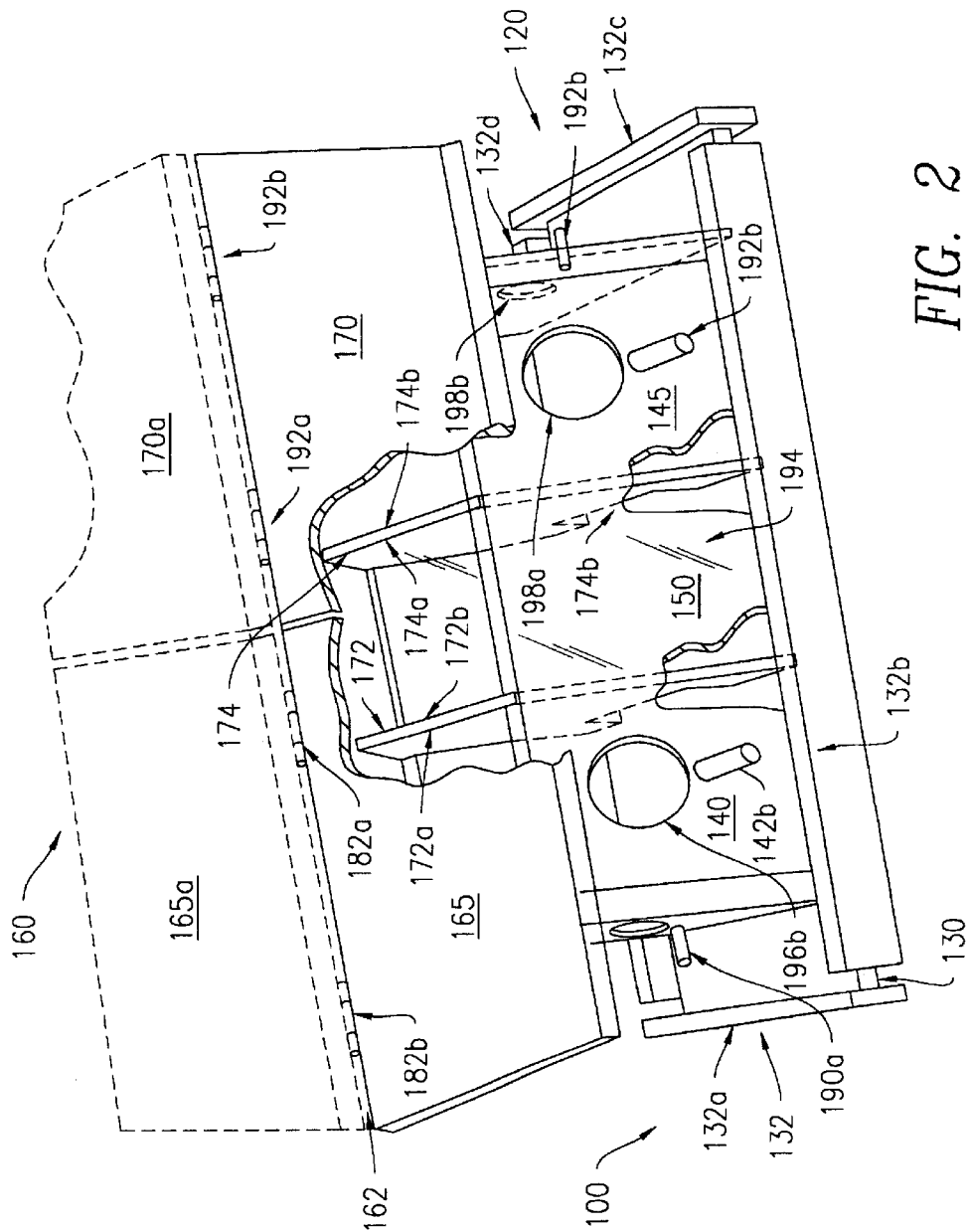
FIG. 2 is a perspective view of an alternate embodiment.

FIG. 2 shows a combined birdhouse and bird feeder 100, comprising a housing 120 which includes a base 130 with an integrated perch 132 on each of the four (4) sides of the base, 132a, 132b, 132c, 132d, a birdhouse 140, a bird feeder 150 and a roof 160. Housing 120 further includes a third section 145 forming a second birdhouse. A common vertical wall 172 forms a vertical wall 172a of birdhouse 140 and forms a vertical wall 172b of bird feeder 150. Furthermore, a common vertical wall 174 forms a vertical wall 174a of bird feeder 150 and forms a vertical wall 174b of bird house 145. The roof 160 includes a first roofsection 165 attached by hinges 182a and 182b to the fixed portion 162 of roof 160 (above birdhouse section 140 and bird feeder section 150) for opening roof section 165 to an open position 165a. Furthermore, the roof 160 includes a second roof section 170 attached by hinges 192a and 192b to fixed portion 162 of roof 160 (above bird feeder section 150 and above birdhouse section 145) for opening roof section 170 to an open position 170a, for filling the bird feeder with bird food, and returning it to a closed position 170b.

The bottom of walls 172 and 174 have openings 172c and 174c, respectively, so bird food can pass through from bird feeder section 150 to birdhouses 140 and 145, respectively.

FIG. 2 shows the combined birdhouse bird feeder 100 and the bird feeder section 150 includes a see through window 194, formed of plastic. Also the birdhouse sections 140 and 145 include openings 196a, 196b, 198a and, 198b respectively for the birds to enter the respective birdhouse sections with peg perches 190a, 190b, 192a, and 192b below the respective openings.

Figure 3:
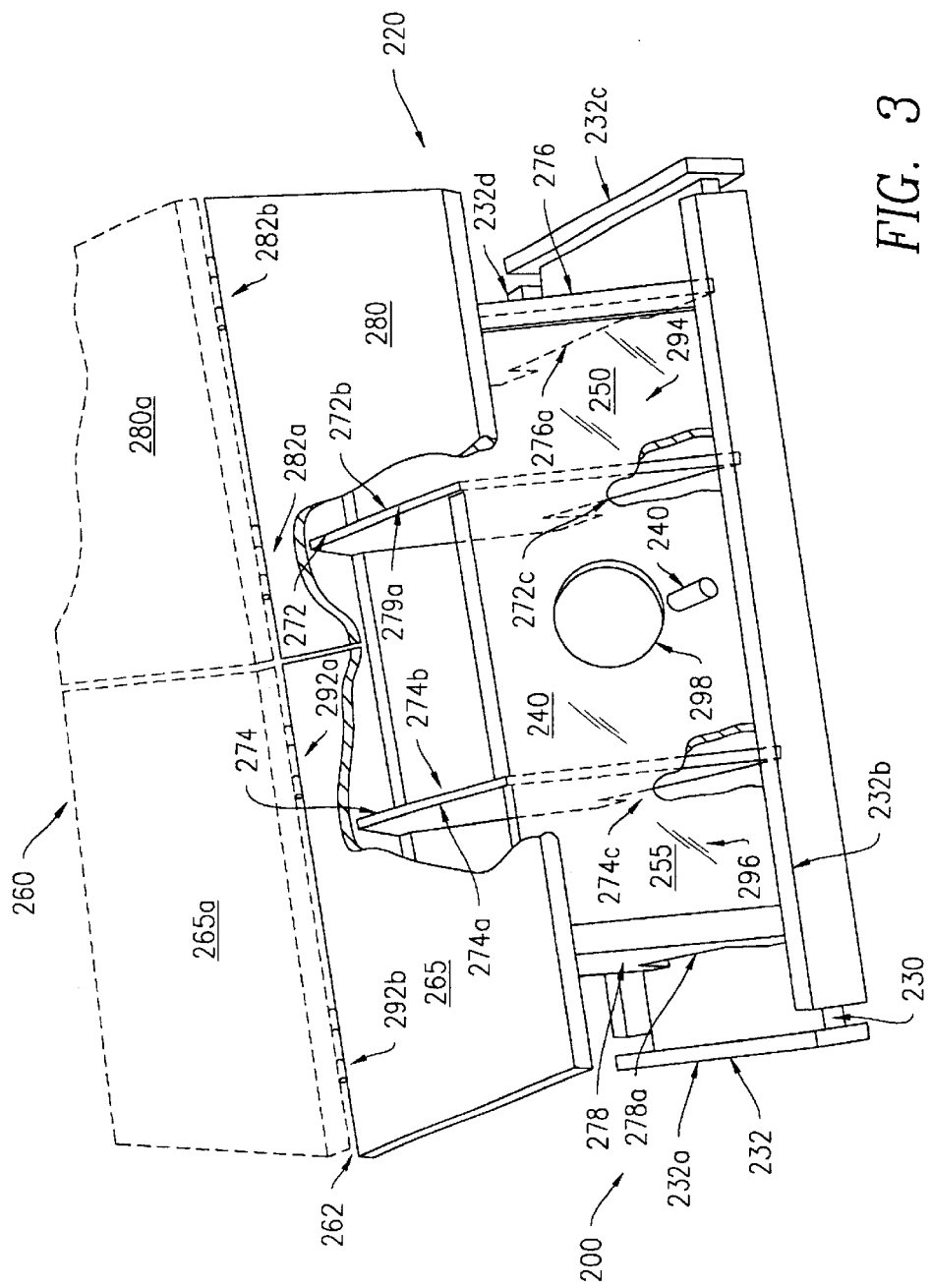
FIG. 3 is a perspective view of an alternate embodiment.

FIG. 3 shows a combined birdhouse and bird feeder 200, comprising a housing 220 which includes a base 230 with an integrated perch 232 on each of the four (4) sides of the base, 232a, 232b, 232c, 232d, a birdhouse 240, a bird feeder 250 and a roof 260. Housing 220 further includes a third section 255 forming a second bird feeder. A common vertical wall 272 forms a vertical wall 272a of birdhouse 240 and forms a vertical wall 272b of bird feeder 250. Furthermore, a common vertical wall 274 forms a vertical wall 274a of bird feeder 255 and forms a vertical wall 274b of birdhouse 240. The roof 260 includes a first roof section 280 attached by hinges 282a and 282b to the fixed portion 262 of roof 260 (above birdhouse section 240 and bird feeder section 250) for opening roof section 280 to an open position 280a. Furthermore, the roof 260 includes a second roof section 265 attached by hinges 292a and 292b to fixed portion 262 of roof 260 (above bird feeder section 255 and above birdhouse section 240 for opening roof section 265 to an open position 265a, for filling the bird feeder with bird food.

The bottom walls 272 and 274 have openings 272c and 274c, respectively, so bird food can pass through from bird feeder sections 250 and 255, respectively, to birdhouse 240. Far end walls 276 and 278 of respective bird feeder sections 250 and 255 also have respective openings 276a and 279a so bird food can pass through from bird feeder sections 250 and 255 to respective outside perch sections 232a and 232c.

FIG. 3 shows the combined birdhouse and bird feeder 200 and the bird feeder sections 250 and 255, respectively, include see through windows 294 and 296, formed of plastic. Also birdhouse section 240 includes opening 298 for the birds to enter the birdhouse section with a peg perch 290 below opening 298.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A combined birdhouse and bird feeder integrated unit, comprising:
   a) a housing including a base, a first section forming a birdhouse, a second section forming a bird feeder being adjacent to said birdhouse, and further including a roof;
   b) a common vertical wall between said birdhouse and said bird feeder, and forming the common vertical wall of said birdhouse and said bird feeder;
   c) at least a first outer wall to close said bird feeder in order to retain bird food therein; said first outer wall having an opening at the bottom thereof for access to the bird food therein;
   d) said birdhouse having at least a second outer wall to close said birdhouse, said second outer wall having an opening therein for birds to pass through;
   e) said roof including a first roof section above said bird feeder for moving between an open position and a closed position for filling said bird feeder with bird food; and
   f) means for movably mounting said first roof section to move between said open and closed positions.

2. The combined birdhouse and bird feeder intergated unit in accordance with claim 1, wherein said bird feeder includes a see-through window formed of plastic.

3. The combined birdhouse and bird feeder intergated unit in accordance with claim 1, wherein said housing further includes a third section forming a second birdhouse or a second bird feeder.

4. The combined birdhouse and bird feeder intergated unit in accordance with claim 1, wherein said roof includes a second roof section above said birdhouse for moving between an open position and a closed position for accessing said birdhouse.

5. The combined birdhouse and bird feeder intergated unit in accordance with claim 1, wherein said means for movably mounting said first roof section to move between said open and closed positions include one or m ore hinge members.

6. The combined birdhouse and bird feeder intergated unit in accordance with claim 4, wherein said second roof section includes means for movably mounting said second roof section to move between said open and closed positions.

7. The combined birdhouse and bird feeder intergated unit in accordance with claim 6, wherein said means for movably mounting said second roof section to move between said open and closed positions include one or more hinge members.

8. A combined multiple birdhouse and a center bird feeder integrated unit, comprising:
   a) a housing including a base, a first section forming a first birdhouse, a second section forming a center bird feeder, and a third section forming a second birdhouse;
   b) said housing further including a roof;
   c) a first common vertical wall between said first birdhouse and said center bird feeder and a second common vertical wall between said second birdhouse and said center bird feeder;
   d) first and second birdhouse outer walls; said first birdhouse outer wall for closing said first birdhouse, and said first birdhouse outer wall having one or more openings therein for birds to pass through; said second birdhouse outer wall for closing said second birdhouse, and said second birdhouse outer wall having one or more openings therein for birds to pass through;
   e) said center bird feeder including a front outer wall and a rear outer wall for closing said center bird feeder in order to retain bird food therein;
   f) said first and second common vertical walls each having an opening at the bottom thereof for access to the bird food within each of said first and second birdhouses;
   g) said roof including a first roof section and a second roof section above said first and second birdhouses and said center bird feeder for moving between an open position and a closed position for accessing said first and second birdhouses and for filling said center bird feeder with bird food; and
   h) means for movably mounting said first and second roof sections to move between said open and closed positions.

9. The combined multiple birdhouse and a center bird feeder intergated unit in accordance with claim 8, wherein said means for movably mounting said first and second roof sections to move between said open and closed positions includes a plurality of hinge members.

10. The combined multiple birdhouse and a center bird feeder intergated unit in accordance with claim 8, wherein said center bird feeder includes see-through windows formed of plastic.

11. The combined multiple bird feeder and a center birdhouse integrated unit, comprising:
   a) a housing including a base, a first section forming a first bird feeder, a second section forming a center birdhouse and a third section forming a second bird feeder;
   b) said housing further including a roof;
   c) a first common vertical wall between said first bird feeder and said center birdhouse and a second common vertical wall between said second bird feeder and said center birdhouse;

d) first and second bird feeder outer walls; said first bird feeder outer wall for closing said first bird feeder in order to retain bird food therein, and said first bird feeder outer wall having a first opening at the bottom thereof for access to the bird food therein; said second bird feeder outer wall for closing said second bird feeder in order to retain bird food therein; and said second bird feeder outer wall having a second opening at the bottom thereof for access to the bird food therein;

e) said center birdhouse including a front outer wall and a rear outer wall to close said center birdhouse, said front and rear outer walls each having an opening therein for birds to pass through;

f) said roof including a first roof section and a second roof section above said first and second bird feeders and said center birdhouse for moving between an open position and a closed position for filling said first and second bird feeders and for accessing said center birdhouse; and g) means for movably mounting said first and second roof sections to move between said open and closed positions.

12. The combined multiple bird feeder intergated unit and a center birdhouse in accordance with claim 11, wherein said means for movably mounting said first and second roof sections to move between said open and closed positions includes a plurality of hinges.

13. The combined multiple bird feeder intergated unit and a center birdhouse in accordance with claim 11, wherein each of said first and second bird feeders include see-through windows formed of plastic.

* * * * *